United States Patent
Deve

[15] 3,682,200
[45] Aug. 8, 1972

[54] PISTON VALVE

[72] Inventor: Vagn Deve, 705 Valleyview Road, Pittsburgh, Pa. 15219

[22] Filed: Oct. 27, 1970

[21] Appl. No.: 84,375

[52] U.S. Cl. ............................. 137/625.47, 251/309
[51] Int. Cl. ........................... F16k 11/07, F16k 5/04
[58] Field of Search .................... 251/309–312, 317; 137/625.47

[56] References Cited

FOREIGN PATENTS OR APPLICATIONS

| 613,540 | 12/1960 | Italy ........................... 251/309 |
| 370,312 | 4/1939 | Italy ........................... 251/309 |
| 831,611 | 3/1960 | Great Britain ............. 251/317 |
| 620,068 | 2/1957 | Canada ....................... 251/309 |

*Primary Examiner*—Henry T. Klinksiek
*Attorney*—Pierre Lesperance

[57] ABSTRACT

A valve having a valve body provided with a fluid bore and a cylinder bore intersecting and oblique to each other, a piston movably mounted in the cylinder bore and a seal around the piston, said seal being perpendicular to the piston axis and therefore in an inclined plane relative to of the fluid bores, and said cylinder bore has a cross-section at least as large as the cross-section of said fluid bore, such that the inclined seal effectively seals the fluid bore when the valve is closed. The piston is prevented from rotating and has a transverse fluid passage of the same diameter as the fluid bore and arranged to form with the latter a through bore of uniform cross-section in the valve body. A pressure fluid supply is connected to one or both ends of the cylinder bore to move the piston between valve closing and opening positions.

5 Claims, 6 Drawing Figures

Patented Aug. 8, 1972

INVENTOR
Vagn DEVE
BY
Pierre Lespérance
AGENT

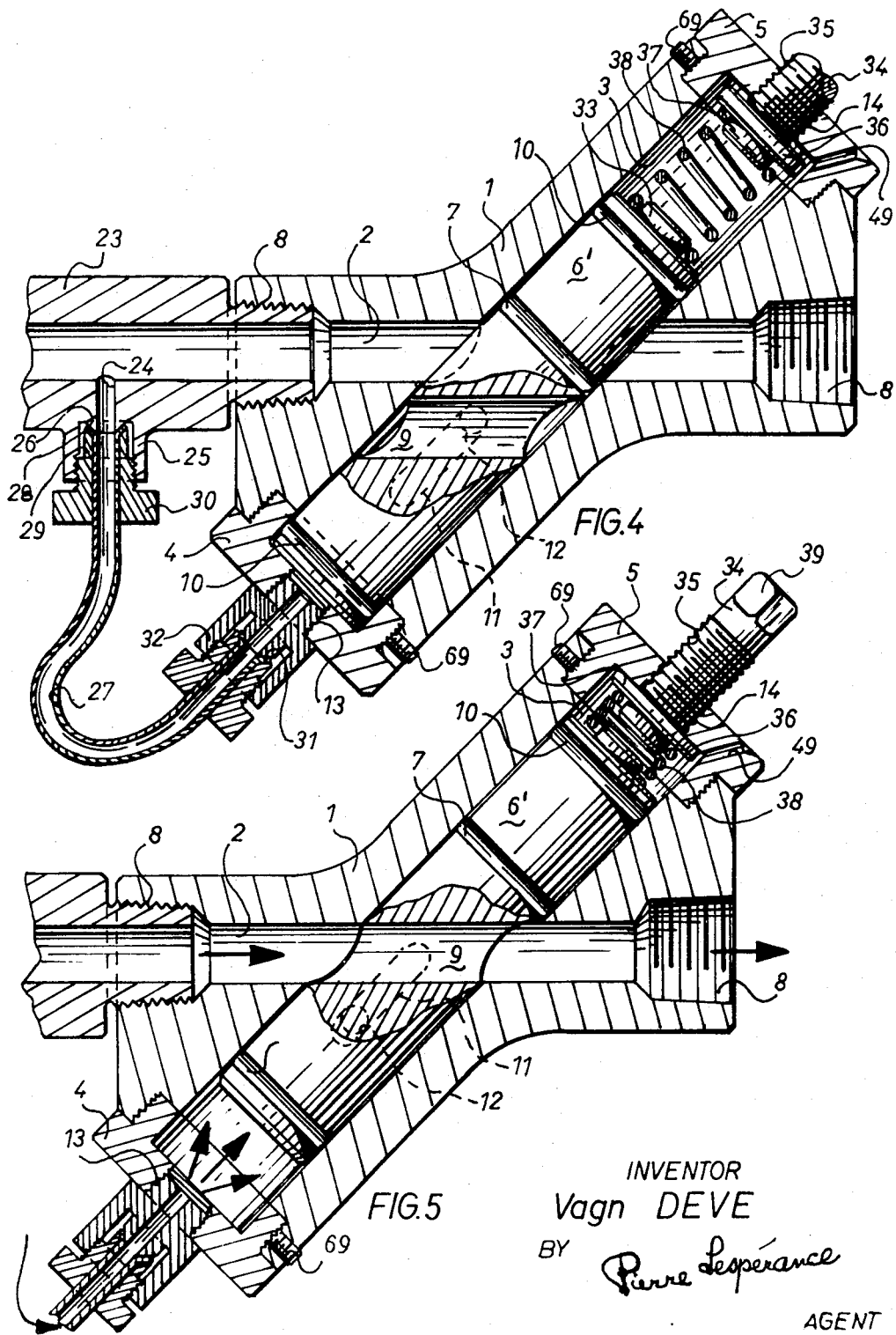

PISTON VALVE

This invention relates to a fluid valve and, more particularly, to a piston valve.

It is a general object of the invention to provide a valve of the piston type with an efficient and simple seal.

It is a more specific object of the invention to provide a valve with a piston having a seal therearound arranged to extend in an inclined plane and intersecting a fluid passage when the valve is closed.

It is another object of the invention to provide a valve having a fluid bore of uniform cross-section extending therethrough.

Preferred embodiments of the invention will now be described in detail, by way of example only, with reference to the following drawings, wherein:

FIGS. 4 and 5 are cross-sectional views of a second embodiment of the invention showing the valve in closed and open positions respectively.

The various embodiments illustrated will now be described in detail with reference to the drawings wherein identical parts will be identified by the same reference numerals throughout the different views.

Figures 1, 2, 3:
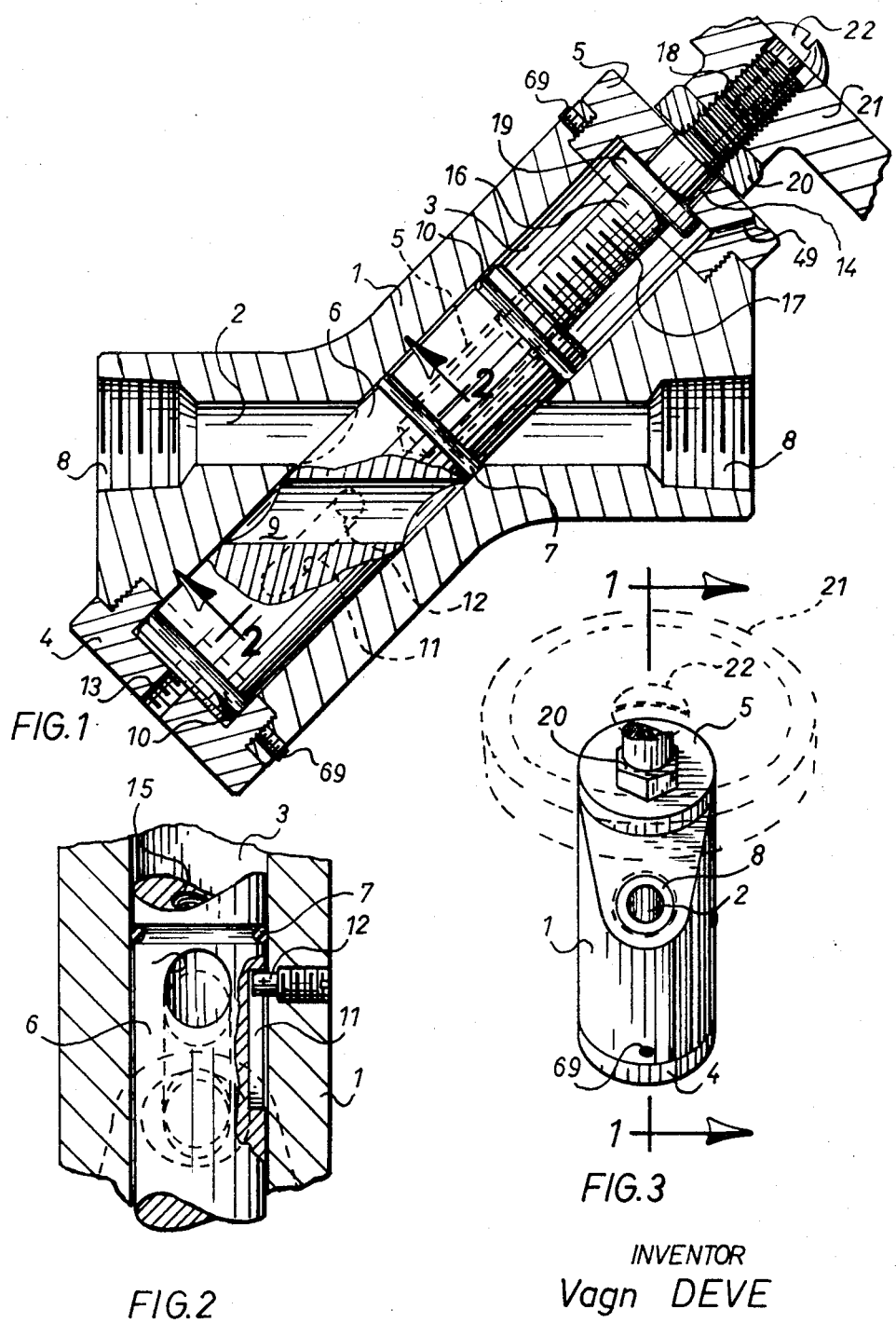
FIG. 1 is a cross-sectional view of a first embodiment of the invention, as seen along line 1—1 in FIG. 3.
FIG. 2 is a cross-sectional view as seen along line 2—2 in FIG. 1.
FIG. 3 is an end view of the first embodiment of the invention shown in FIGS. 1 and 2.

The valve according to the embodiment of FIGS. 1, 2, and 3 comprises a valve body 1 provided with a fluid bore 2 and a cylinder or piston bore 3 intersecting each other at an inclined angle. Caps 4 and 5 are screw threaded at the opposite ends of the cylinder bore 3. A piston 6 is movably mounted in the cylinder bore 3 and a seal 7 is placed in a groove extending around the piston 6 in a plane perpendicular to the longitudinal axis of piston 6. The cylinder bore 3 is larger than the fluid bore 2, such that the whole periphery of the seal 7 engages the inside surface of the bore 3. The fluid bore 2 is provided at each end with a screw threaded portion 8 to connect the valve into a fluid line to control the flow therein.

The piston 6 is cylindrical and the seal 7 is circumferentially positioned around the cylindrical piston 6 intermediate the ends thereof. A fluid bore 9 of the same diameter as the fluid bore 2 extends transversely through the piston 6, parallel to the fluid bore 2. A seal 10 is provided around each end of the cylindrical piston 6. A guiding groove 11 is formed into the outer surface of the piston 6 and extends longitudinally thereof. A threaded pin 12 is screwed into the valve body 1 with its inner end engaging in the guiding groove 11.

It must be noted that the groove 11 and the pin 12 guide the piston 6 for longitudinal movement along the cylinder bore 3 such that the transverse fluid bore 9 always remains parallel to the fluid bore 2, whereby when the piston is moved to the closed position, the transverse fluid bore 9 forms with the fluid bore 2 a rectilinear through bore into the valve body 1.

It must also be noted that the seal 7 is positioned in an inclined plane relative to the fluid bore 2 such that, upon longitudinal movement of the piston 6 to the closed position, the seal 7 extends in a substantially diagonal plane relative to the fluid bore 2 such as to seal the latter.

As mentioned earlier, the cylinder bore 3 is larger than the fluid bore 2, thereby causing the seal 7 to engage the surface of the bore 3 along its complete periphery. Openings 13 and 14 are provided through the end caps 4 and 5, respectively.

It should be understood by anyone skilled in the art that the structure so far described could be used as such, wherein the piston 6 would be free floating and actuated by a compressed fluid selectively entering either the openings 13 or the opening 14, thereby urging the piston 6 in one or the other longitudinal direction, resulting in opening or closing of the valve.

The piston 6 is provided with a threaded axial bore 15. A stem 16 is rotatably mounted into the bore 14 of the end cap 5. Screw threads 17 and 18 are provided at the opposite ends of the stem 16. The screw threads 17 are matching the screw threads 15 and are arranged to have a jack-screw action therewith upon rotation of the stem 16. An annular flange 19 is formed on the stem 16 intermediate the screw threads 17 and 18, such as to abut against the inner face of the end cap 5. A nut 20 is screwed onto the threaded outer end 18 such as to cooperate with the flange 19 to hold the stem 16 against axial displacement relative to the valve body 1 and the end cap 5. A handle 21 is threaded on the screw threads 18 and a screw 22 is threaded into the end of the stem 16 and holds the handle 21 fixed thereto. The handle 21 is provided to actuate the piston 6 to cause axial displacement thereof and, by the jack-screw action of the threads 15 and 17, opening and closing of the valve upon alignment and disalignment of the transverse fluid bore 9 with the fluid bore 2.

The embodiment illustrated in FIGS. 4 and 5 is adapted to be used as a check or safety valve. The valve body 1 and caps 4 and 5 and piston 6' are identical to body 1 and piston 6 of FIG. 1, except that piston 6' has no bore 15. A connecting pipe section 23 is connected to the inlet portion of the fluid bore 2. The pipe section 23 is provided with a radially extending opening 24 and a screw threaded connecting extension 25 concentric thereto. A conical surface 26 surrounds the outer end of the opening 24. A metal tube 27 has a flared end 28 engaging the conical surface 26 and a ring 29 is arranged around the tube 27 against the flared end 28 to firmly hold the latter. A nut 30 is provided to lock the flared end 28 of the tube 27 in fluid-tight engagement with the conical surface 26. The other end of the metal tube 27 is similarly connected to the conical surface 31 of an axially bored plug 32 screw threaded into the opening 13 of the end cap 4. The piston 6 has an axial extension 33 at the end thereof facing the end cap 5. A stem 34 is threaded at 35 and is threadedly mounted into the opening 14. An annular flange 36 is provided short of the inner end of the stem 34 to form an axial extension 37 aligned and facing the extension 33. A compression spring 38 is engaged and extends around the axial extensions 33 and 37 between the piston 6 and the annular flange 36.

When the pressure in the inlet portion of the fluid bore 2 and the connecting pipe section 23 is lower than the acceptable limit, the force of the spring is sufficient to hold the piston in the closed position, as shown in FIG. 4. When the pressure into the inlet portion of the fluid bore 2 and into the connecting pipe section 23 passes a predetermined acceptable limit, the fluid flows through the bore 24 and the tube 27, resulting in movement of the piston 6 against the bias of the spring 38 until the transverse fluid bore 9 registers with the fluid bore 2 corresponding to the opening of the valve and flow of a fluid therethrough, as shown in FIG. 5. When the pressure has sufficiently dropped, the spring 38 counteracts the pressure in the connecting pipe section 23 and returns the valve to closed position. The stem 34 is machined at 39 to form a grip for a tool to rotate the stem and to thereby vary the bias of the spring 38 and hence the limit pressure accepted in the inlet portion of the fluid bore 2.

Figure 6:
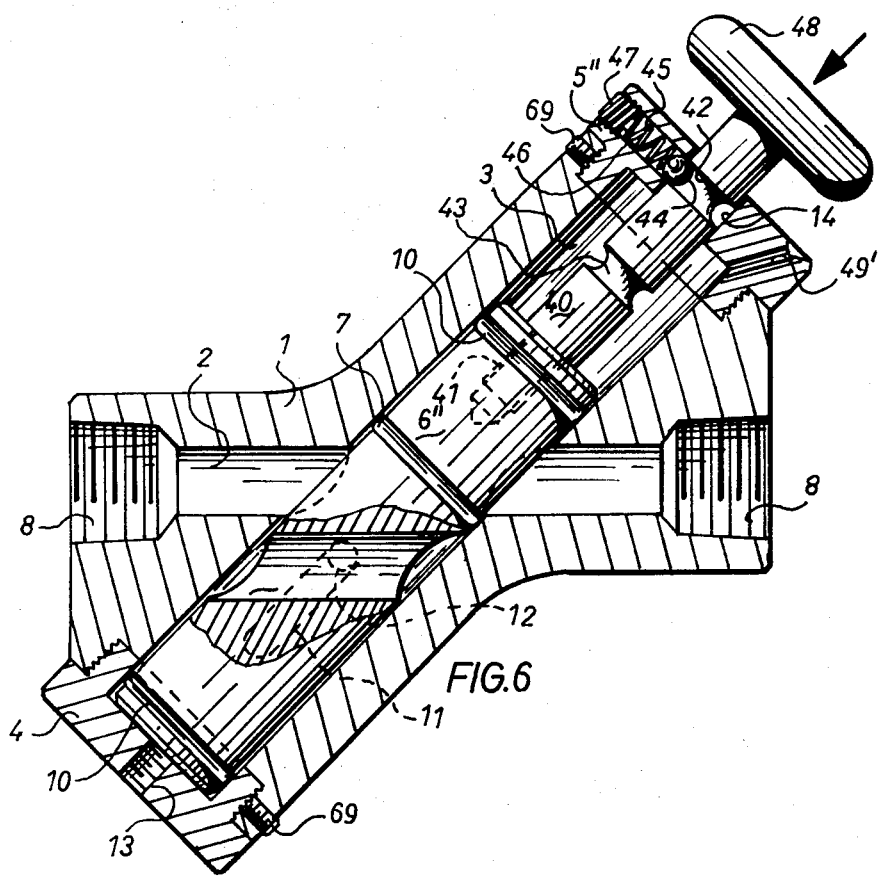
FIG. 6 is a cross-sectional view of a third embodiment of the invention showing the valve in closed position.

The embodiment of FIG. 6, to which particular reference will now be made, is arranged to be hand operated. Valve body 1, cap 4 and piston 6'' are identical to valve body 1, cap 5 and piston 6 of the first embodiment, except bore 15 is replaced by bore 41. A stem 40 is screw threaded and fixed in bore 41 or otherwise anchored into the end of the piston 6 facing the end cap 5''. The stem 40 is provided with a pair of annular grooves 42 and 43, or notches, spaced apart along the stem 40 a distance corresponding to the course of the piston 6 between the closed and the open positions of the latter. A ball 44 is biased by a spring 45 into engagement with the side of the stem 40, such as to engage into a groove 42 or 43, when registering therewith. The ball 44 and the spring 45 are mounted into a radial hole 46 into the end cap 5'' and an adjustable screw 47 closes the hole 46 to retain the ball and spring inside thereof. As is well known, the screw 47 can be rotated to vary the pressure of the spring 45 on the ball 44. The annular groove 43 is arranged such that the ball 44 engages therein when the transverse fluid bore 9 is aligned with the fluid bore 2. A handle or knob 48 is fixed on the outside end of the stem 40 to provide a hand grip for axial displacement of the stem 40 and the piston 6''.

It will be readily understood that the ball 44 and the grooves 42 and 43 will hold the piston 6'' in either the closed or open position and that an axial force exerted on the stem 40 will cam the ball 44 outwardly disengaging the same and allowing axial displacement of the piston 6''.

An air vent 49 or 49' is preferably provided through the end cap 5 or 5'' in the above-described embodiments to allow escape and entry of air into the cylinder bore 3 between the piston 6 and the end cap 5 or 5''. As is well known, the vent 49 or 49'' will prevent undue resistance to displacement of the piston 6 caused by the pressure of the air inside the cylinder bore 3.

In all the embodiments, a tightening screw 69 may be provided into the valve body 1 in cooperation with each cap 4 or 5 or 5'', to lock the same in position.

It will be appreciated that the seals 10 are provided to prevent leakage between the outside surface of the piston 6 and the inside surface of the cylinder bore 3 in all embodiments of the invention.

It should be realized that a number of fluid bores could be provided through the same piston in cooperation with fluid bores in one or more valve bodies for synchronous actuation.

It must be understood that the same principle of inclined seal could be embodied in valves wherein the seal would be held into the valve body around the piston.

I claim:

1. A piston valve comprising a valve body having aligned inlet and outlet fluid passages extending therethrough and an elongated cylinder bore inclined to said passages and forming an intersection with said passages, the cross-section of said passages at said intersection extending wholly within the breadth of said cylinder bore, a piston freely longitudinally movable in said cylinder bore, complementary guide means on said piston and in said cylinder bore to prevent rotation of said piston in said cylinder bore, said piston having a transverse fluid passage extending therethrough inclined to the longitudinal axis of said piston, aligned with said passages in the valve opening position of said piston and offset from said passages in the valve closing position of said piston, said cylinder bore having an aperture at each end means to supply fluid under pressure connected to one of said apertures at one end of said cylinder bore, whereby pressure fluid will move said piston to this valve opening position, a first seal around the end of said piston closer to said one end of said cylinder bore and a second seal around said piston adjacent said transverse fluid passage, both said seals in planes perpendicular to the longitudinal axis of said piston, said transverse fluid passage disposed intermediate said first and second seals, said second seal extending diagonally across said pair of aligned passages in the valve closing position of said piston.

2. A piston valve as claimed in claim 1, wherein said means to supply fluid under pressure are connected to both apertures whereby pressure fluid will also move said piston to its valve closing position, and a third seal around the other end of said piston.

3. A piston valve as claimed in claim 1, further including a compression spring inserted into the other end of said cylinder bore and arranged to bias the piston towards said one end of said cylinder bore into valve closing position.

4. A piston valve as claimed in claim 3, further including means to adjust the bias of said compression spring on said piston exteriorly accessible through the other of said apertures.

5. A piston valve as claimed in claim 3, wherein said fluid supply under pressure is formed by a conduit connecting said one aperture with said inlet fluid passage.

* * * * *